Patented Nov. 23, 1926.

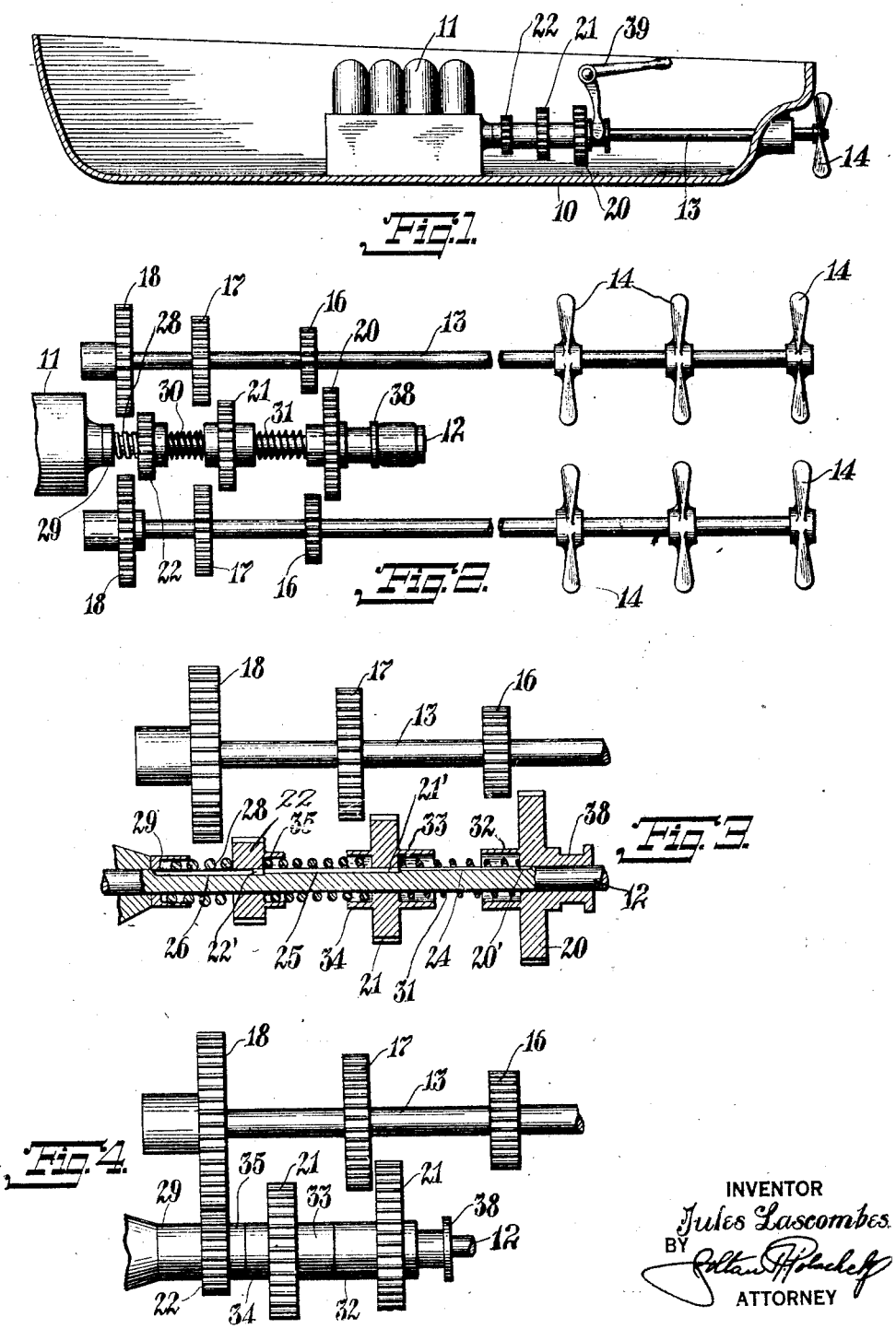

1,608,471

UNITED STATES PATENT OFFICE.

JULES LASCOMBES, OF SHREWSBURY, NEW JERSEY.

POWER-TRANSMISSION MEANS.

Application filed December 9, 1924. Serial No. 754,713.

This invention relates to power transmission mechanism of the change speed type, the invention being intended more particularly for embodiment in vehicles, and being here shown as applied to the propulsion of a boat or ship.

The invention has for an object to provide a novel and improved type of transmission mechanism which is readily shiftable to vary the transmission ratio.

For further comprehension of the invention, and of the objects and advantages thereof, reference will be had to the following description and accompanying drawing, and to the appended claims in which the various novel features of the invention are more particularly set forth.

Fig. 1 of the drawing is a longitudinal sectional view showing a boat with my improved transmission mechanism applied thereto.

Fig. 2 is a plan view of the transmission mechanism.

Fig. 3 is an enlarged fragmentary view, partly plan and partly horizontal section, showing the transmission.

Fig. 4 is an enlarged fragmentary plan view of the transmission mechanism, showing the same arranged to drive at low speed.

In the drawing the reference numeral 10 indicates the hull of a boat in which is mounted an internal combustion engine of ordinary type. The shaft of this engine is shown at 12, while on each side thereof a countershaft 13 is positioned, the shafts 13 being driven from the engine shaft 12, and extending rearwardly through the stern of the hull and having propellers 14 mounted on their rear ends. Upon each of these shafts three gears 16, 17 and 18 respectively are mounted, these gears being spaced along the shaft and varying progressively in diameter.

These gears are adapted to be selectively engaged by a series of three gears 20, 21 and 22 mounted on the engine shaft, or drive shaft 12. The gears 20, 21 and 22 are feathered on the shaft so as to be slidable along the latter while receiving rotation therefrom. As here shown the gears are formed with keys 20′, 21′ and 22′ that project into a longitudinal groove in the shaft 12. As clearly shown in Fig. 3 of the drawing this groove is formed in three sections 24, 25 and 26, of progressively increased depth, while the shouldered elements at the junction of these sections are normally engaged by the keys to limit sliding movement of the gears in one direction on the shaft 12. Surrounding the shaft 12, between the engine 11 and the gear 21, is a coiled expansion spring 28 that bears between a recessed collar 29 fixed on the said shaft and the gear 22, and normally retains it in position with its key abutting against the end of the groove section 26. A similar but weaker spring 30 surrounds the shaft 12 between said gear 22 and the intermediate gear 21, while a third and still weaker spring 31 surrounds the shaft 12 between the gears 21 and 20. Formed on the adjacent faces of the gears 20 and 21 are cylindrical flanges 32 and 33 and that surround the ends of the spring 31, while shorter cylindrical flanges 34 and 35 project from the adjacent faces of the gears 21 and 22 and surround the ends of the spring 30. The gear 20 is formed with a grooved hub 38 in which an ordinary operating lever, such as indicated at 39 in Fig. 1 or one that may be controlled by a mechanical device, engages.

Normally, that is when the device is neutral, the parts occupy the position shown in Figs. 2 and 3, each gear on the shaft 12 being adjacent to but separate from its corresponding gears on the shafts 13. To bring the transmission into operation the gear 20 is moved along the shaft 12 by the lever 39 into mesh with the gear 16. To change the speed one step the gear 20 is moved further along the shaft 12 until it disengages from the gear 16. The flange 32 on this gear 20 then abuts against the flange 33 on the gear 21, and further movement of the lever 39 imparts longitudinal movement to the gear 21 to bring it into mesh with the gear 17. A continued movement of the lever will finally bring the gear 22 into mesh with the gear 18 the parts then occupying the position shown in Fig. 4 of the drawing. When the lever is moved to its original position the springs 28, 30 and 31 return the gears to their neutral positions.

Having thus described my invention, what I claim as new and desire to protect by Letters Patent of the United States is as follows:—

1. In a transmission mechanism, a drive shaft, a driven shaft, a series of gears of progressively varying diameter fixed to the driven shaft and spaced therealong, a series of complementary gears feathered on the drive shaft, one of said last named series of gears being arranged for manual movement along the shaft, and expansion springs of progressively varying strength interposed between the said last named series of gears.

2. In a transmission mechanism, a drive shaft, a driven shaft, a series of gears of progressively varying diameter fixed to the driven shaft and spaced therealong, a series of complementary gears feathered on the drive shaft, one of said last named series of gears being arranged for manual movement along the shaft, and expansion springs of progressively varying strength interposed between the said last named series of gears, and cylindrical flanges projecting from adjacent faces of the different gears of said last named series and surrounding the ends of said springs.

3. In a transmission mechanism, a drive shaft, a driven shaft, a series of gears of progressively varying diameter fixed to the driven shaft and spaced therealong, a series of complementary gears feathered on the drive shaft, one of said last named series of gears being arranged for manual movement along the shaft, and expansion springs of progressively varying strength interposed between the said last named series of gears, and abutment elements projected from adjacent faces of the respective gears of the last named series toward one another, whereby longitudinal movement may be transmitted from one gear to the next one.

4. In a transmission mechanism, a drive shaft, a driven shaft, a series of gears of progressively varying diameter fixed on said drive shaft and spaced therealong, a series of complementary gears freely mounted on said drive shaft, said drive shaft being formed with a longitudinal groove presenting three sections of different depth, keys on the respective gears of the last named sections series projecting into the respective sections of the said groove, the shouldered elements at the junctions of the respective sections acting to limit sliding movement of the gears along said drive shaft in one direction, a fixed collar on said drive shaft, and a series of springs of progressively varying strength bearing respectively between said collar and one end gear of the series on the drive shaft and between the other gears on said drive shaft, the other end gear being arranged for manual movement along the said drive shaft.

5. In a transmission mechanism, a drive shaft, a driven shaft, a series of gears of progressively varying diameter fixed on said drive shaft and spaced therealong, a series of complementary gears freely mounted on said drive shaft, said drive shaft being formed with a longitudinal groove presenting three sections of different depth, keys on the respective gears of the last named sections series projecting into the respective sections of the said groove, the shouldered elements at the junctions of the respective sections acting to limit sliding movement of the gears along said drive shaft in one direction, a fixed collar on said drive shaft, and a series of springs of progressively varying strength bearing respectively between said collar and one end gear of the series on the drive shaft and between the other gears on said drive shaft, the other end gear being arranged for manual movement along the said drive shaft, and abutment flanges projected from the adjacent faces of the respective gears on the drive shaft toward one another.

In testimony whereof I have affixed my signature.

JULES LASCOMBES.